United States Patent
Rudd et al.

[11] Patent Number: 6,115,491
[45] Date of Patent: Sep. 5, 2000

[54] APPARATUS AND METHOD FOR ESTIMATING BACKGROUND TILT AND OFFSET

[75] Inventors: Eric P. Rudd, Hopkins; David Fishbaine, Minnetonka, both of Minn.

[73] Assignee: CyberOptics Corporation, Minneapolis, Minn.

[21] Appl. No.: 09/159,857

[22] Filed: Sep. 24, 1998

Related U.S. Application Data

[63] Continuation of application No. 08/607,846, Feb. 27, 1996, abandoned.

[51] Int. Cl.[7] .............................. G06K 9/52; G06T 1/20; G06T 3/00; G06T 5/40
[52] U.S. Cl. ......................... 382/154; 382/150; 382/151; 382/168; 382/294; 702/40; 702/94; 702/153
[58] Field of Search .................... 382/106, 108, 382/145, 147, 149, 151, 154, 168, 275, 277, 286, 289, 294, 295, 150; 348/87, 126; 250/559.22, 559.23, 559.34, 559.38; 356/375, 376, 237.4, 237.5; 345/437; 702/40, 94, 95, 152, 153

[56] References Cited

U.S. PATENT DOCUMENTS

| | | | |
|---|---|---|---|
| 4,248,532 | 2/1981 | Nosler | 356/1 |
| 4,811,410 | 3/1989 | Amir et al. | 382/8 |
| 4,929,845 | 5/1990 | Amir et al. | 250/561 |
| 4,965,665 | 10/1990 | Amir | 358/101 |
| 5,048,965 | 9/1991 | Amir | 356/376 |
| 5,075,559 | 12/1991 | Amir | 250/560 |
| 5,097,516 | 3/1992 | Amir | 382/1 |
| 5,101,442 | 3/1992 | Amir | 382/62 |
| 5,127,061 | 6/1992 | Amir et al. | 382/58 |
| 5,319,567 | 6/1994 | Ebenstein | 364/474.34 |
| 5,465,152 | 11/1995 | Bilodeau et al. | 356/371 |
| 5,471,541 | 11/1995 | Burtnyk et al. | 382/153 |
| 5,574,801 | 11/1996 | Collet-Beillon | 382/150 |
| 5,644,651 | 7/1997 | Cox et al. | 382/154 |
| 5,780,866 | 7/1998 | Yamamura et al. | 250/559.22 |
| 5,987,189 | 11/1999 | Schmucker et al. | 382/284 |
| 6,002,793 | 12/1999 | Silver et al. | 382/152 |

OTHER PUBLICATIONS

Paulo Lopes et al., Model Based 3D Object Recognition using an Accurate Laser Range Finder, IEEE International Conference on Industrial Electronics, Control, and Instrumentation, 1993, vol. 3, pp. 1696–1701, Nov. 1993.

"Automated Phase–Measuring Profilometry Using Defocused Projection of a Ronchi Grating", by Xian–Yu Su et al., Optics Communications 94, 1992, pp. 561–573.

"Phase–Stepping Grating Profilometry: Utilization of Intensity Modulation Analysis in Complex Objects Evaluation", by Xian–Yu Su et al., Optics Communication 98, 1993, pp. 141–150.

*Primary Examiner*—Leo H. Boudreau
*Assistant Examiner*—Brian P. Werner
*Attorney, Agent, or Firm*—Patterson, Thuente & Skaar, P.A.

[57] ABSTRACT

A computer implemented software device for estimating background tilt and offset is disclosed to preferably be adaptable to an optical measurement instrument wherein the estimated parameters are resolved to generate a reference plane to be subtracted from a height map of a phase profile. A set of histograms of heights is used to develop a merit function. A two-dimensional high speed iterative search is used to optimize the merit function to generate a reference plane coincident with the spatial tilt of the phase profile. The invention enables real-time measurement of substrate height for preferred use in high-speed image processing operations relating to circuit-board production lines.

33 Claims, 3 Drawing Sheets

APPARATUS AND METHOD FOR ESTIMATING BACKGROUND TILT AND OFFSET

This is a Continuation of application Ser. No. 08/607,846 filed Feb. 27, 2996 now abandoned.

FIELD OF THE INVENTION

The disclosed invention relates to metrological instruments. In particular, it relates to a method and apparatus for the robust estimation of tilt and offset of planes in a two-dimensional map. More specifically, in the preferred embodiment, the invention relates to the robust estimation of tilt and offset of planes in phase profilometer height mapping techniques.

BACKGROUND OF THE INVENTION

The printed-circuit board industry has grown increasingly automated in the past few years. The use of surface-mount technology (SMT) has become dominant. In this technology, a paste of solder and flux is applied to the bare circuit board by means of metal stencil and rubber squeegee. The stencil is removed, leaving solder paste "bricks" in appropriate places. Components are then placed on the solder bricks by machine. The solder paste has sufficient viscosity and surface tension to hold the components to the circuit boards temporarily. The stuffed boards are then passed through an oven, which melts the solder paste and makes secure mechanical and electrical connection.

Another technology, called "flip-chip" technology, affixes solder balls directly to an integrated-circuit chip. The chip is inverted (hence the name "flip chip") and placed directly onto the circuit board. The board is passed through an oven to melt the solder and make the electrical and mechanical connection.

Along with this automation, the need has arisen for automatic inspection of the circuit boards prior to the placement of components on them. Defects in the stencil or squeegee can result in uneven or missing solder bricks, which can cause a component lead to fail to make contact with the circuit board. The earlier this defect can be caught, the less money and time will be wasted on further processing and testing of a defective board.

Copending U.S. patent application Ser. No. 08/820,380, titled Method And Apparatus For Three Dimensional Imaging Using Multi-Phased Structured Light assigned to the assignee of this application, discloses an instrument for the automatic inspection of the solder paste pads of a circuit board prior to the placement of components onto the board. Copending U.S. patent application No. 08/607,845 titled Method And Apparatus For High Precision Three Dimensional Imaging Using Multi-Phased Structured Light discloses an instrument useful for the inspection of the solder balls on the flip chip prior to placement on the circuit board. Both applications are herein incorporated by reference.

The instruments disclosed in the above-referenced copending applications both assess the surface topography of a target object by producing an image from the reflection of structured light projected onto the surface of the target object. The intensity of the detected light corresponds to the height of the target object surface. The imaging method used by the instruments suppresses extraneous artifacts due to traces, silk-screened lettering, etc., and clearly reveals the solder, since it has a height dimension that the extraneous artifacts do not have.

A critical factor in the processing of these images is a robust means of measuring the heights of the solder bricks or balls. Since the location and registration of the circuit board or flip chip cannot be precisely controlled, the height and tilt of the substrate are subject to variations. Further, since the important measurement is the height of the solder above the substrate, a simple measurement of the absolute height of the solder will be affected by the errors in board registration. It is therefore necessary to estimate the height of the substrate at each solder brick or ball location, so that a differential measurement can be made of the solder heights. Generally, for the preferred methods and apparatus of this invention, this operation can be considered to be the estimation and subtraction of a tilted reference plane from the height map.

The measurement of the substrate height is relatively straightforward in principle, but there are a number of complications in practice which must be overcome.

1. The substrate may have tilts as well as offsets. The tilts need to be estimated.

2. Circuit boards usually contain a number of parallel planes, e.g., bare board, solder mask, solder pads, etc. Each of these planes lies at a different height. Depending on the proportion of each type of surface feature, the average height in a given field of view is apt to vary. Thus a simple average is unsatisfactory. A least-squares fit to the substrate is apt to give particularly, unsatisfactory results if one side of the image contains a higher proportion of tall planes, and the other side of the image contains a lower proportion of tall planes.

3. The very target objects to be measured, the solder bricks and balls, will have a large effect on the average height in a given field of view; the reference plane estimate must not be affected to any great degree by them. Since the purpose of this substrate de-tilting is to make the feature extraction and measurement easy, attempts to locate the balls and exclude them from reference-plane calculations lead to a dilemma.

4. The height map may be in the form of a phase image, whose circular nature gives rise to the phenomenon of phase wrapping. Before an appropriate offset is applied, phase wraps that may exist in the image must be considered. An effective estimation technique must not be affected by this phenomenon.

Prior art practice generally involved measurement of the brick or ball heights by measuring the height of the substrate somewhere near the brick or ball. This technique is subject to excessive error, since if a tilt exists in the substrate, the height of the substrate underneath the brick or ball is not the same as the height of the substrate in the location where it is measured. Furthermore, owing to irregular circuit-board topography, even if the substrate were not tilted, the substrate height itself may vary.

Accordingly there is a need for a method and device which can provide accurate and reliable measurement of background tilt and offset of planes in a two-dimensional map of a reference substrate while overcoming the limitations and problems of the prior art.

SUMMARY OF THE INVENTION

The problems outlined above are in large measure solved by the method and apparatus for estimating background tilt and offset in accordance with the present invention. The invention is particularly useful in conjunction with high-speed image-processing operations for quality-control inspection on circuit-board production lines.

The method and apparatus in accordance with the present invention employs a process implemented in software, integrated with an optical measurement instrument. Specifically, the present invention calculates a merit function, which is greatest when the tilt of the reference plane coincides with the tilt of the substrate. A two-dimensional iterative search is used to maximize the merit function and thus establish the tilt of the reference plane. The two dimensions of the search are the degree of tilt about the x-and y-axes. This tilted reference plane can then be subtracted from the raw image, producing an untilted substrate. A further operation is then performed to estimate the height of the untilted substrate. This height offset can then be removed as well, which produces a height image where the heights of the features can be measured directly.

The choice of merit function is a central element of this technique. The invention employs a merit function that is calculated from a histogram of heights in the image. The basic concept recognizes that if the tilt in the substrate is removed, the parallel, flat planes in the substrate will each have constant height and will produce tall peaks in the histogram. This is true regardless of their distribution in the image. The example cited earlier, where a tall plane is on one side of the image, and a lower-lying plane is on the other side of the image, is correctly handled by this histogram technique.

After the tilt of the reference plane has been established, its tilt can be removed from the height map, producing an untilted substrate. Further, the offset of the substrate can be removed to provide a realistic height map of the phase profile.

DETAILED DESCRIPTION OF THE INVENTION

Figure 1:
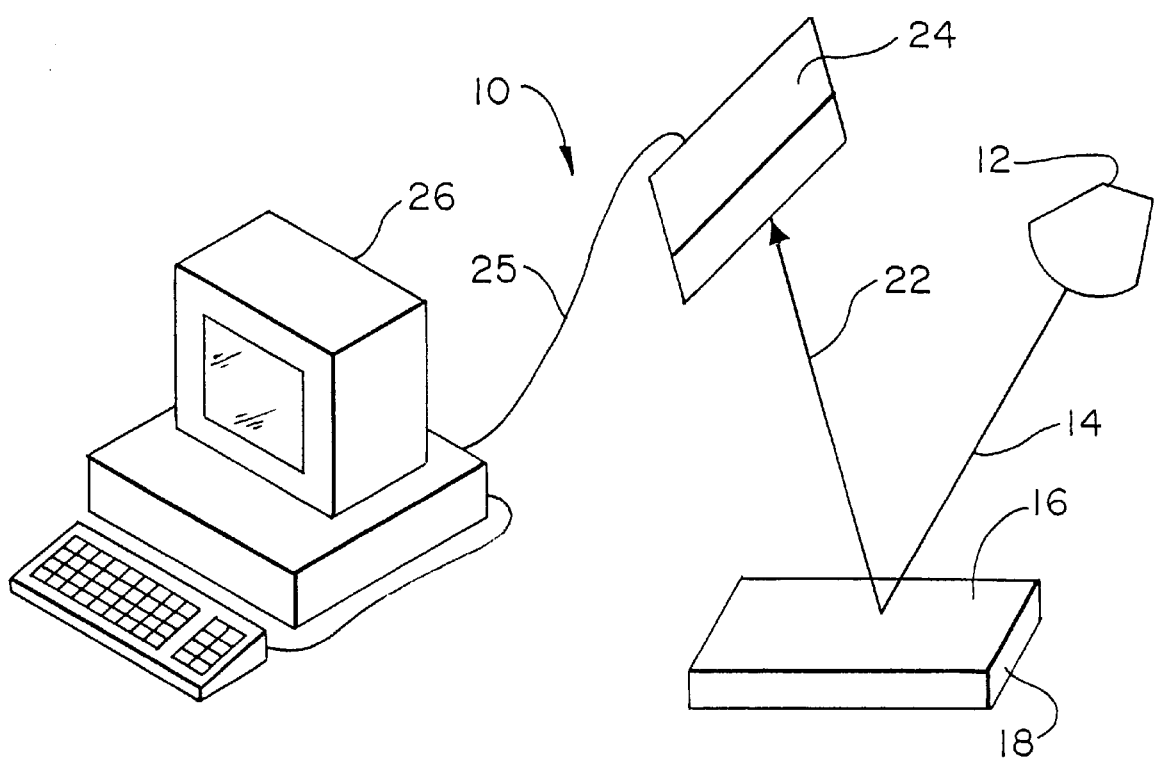
FIG. 1 is a schematic view of an optical measuring system connected with a computer to obtain measurements relative to a desired reference frame.

In the preferred embodiment a phase profile of an object is measured using the computer-implemented software to estimate background tilt and offset. Referring now to the draftings and in particular to FIG. 1, apparatus 10 comprising an optical measurement instrument is shown. For the purposes of depicting the preferred embodiment of the present invention, apparatus 10 includes a light source 12 that directs light 14 toward surface 16 of object 18. The reflected light 22 is observed by detector 24. The readings of detector 24 are transmitted via interface line 25 to computer system 26. Computer system 26 includes computer-implemented software which performs the necessary analysis of the recorded data to determine background tilt and offset in order to provide all accurate measurement of the surface topography of object 18.

As indicated hereinabove, an important aspect of image processing for phase profilometry height mapping of a target object is the robust estimation and removal of background tilt and offset from the substrate. When the optimal reference frame is determined, the height measurements are essentially referenced relative to the substrate. The variety of heights presented on the surface of a target object are measured with reference to what is assumed to be a generally flat substrate.

The invention employs a merit function, optimized to generate a reference plane which will enable differential measurement of the height in the profile map. The reference plane is used to estimate the background tilt and offset. It is preferred that a quantity or quantities be associated with the estimate so that the optimization can be performed by finding an extremum in the quantity. The quantity will preferably represent a global quality of the measurements that is, properites of the image taken over a wide area.

In developing the merit function, the first quantity element is the histogram of heights which is formed in the raw image. The principal concept in the generation of the histogram of heights is that once the substrate is isolated from the effects of the tilt, each of the planes will have constant height. This means that histograms located at the same plane will exhibit identical heights.

A simple but effective measure of the "peakiness" of the histogram is simply the sum of the squares of the histogram values. A good intuitive grasp of the effectiveness of this procedure can be gained by imagining that there are 256 pixels in the image, and 256 intervals in the histogram. If the image is badly tilted, there will be an approximately uniform distribution of phases. Thus, in the simplified illustrative example, we would have one pixel in each of the 256 intervals. The square of 1 is 1, and thus the sum would be 256. However, if the image were perfectly flat and de-tilted, all the pixels would lie at the same height. Thus one interval in the histogram would have the value 256, and the other zero. The square of 256 is 65536, and thus the sum of squares would also be 65536. This is 256 times greater than the merit function in the badly-tilted case.

The offset is the height of the untilted substrate. In order to produce a height image where the heights of the features can be measured directly, the offset must be removed from the calculated tilt of the reference plane. One means of finding the offset of the reference plane is to find the tallest peak in the histogram. However, this is inadequate as a final estimate, since many circuit boards have a predominance of two heights in the substrate (for instance, bare fiberglass and solder mask), which creates a double peak in the histogram. Slight variations in the field of view or board manufacture will cause one or the other peak to be the tallest, and thus the estimate may choose either. Since consistency is the most important factor in industrial process control, this erratic behavior is unacceptable. Thus, this estimate is only used as a starting point for a more stable procedure. The histogram values within a neighborhood about the initial estimate are squared, and the centroid of these values is computed. This weights the peak more heavrily than the outliers, but the technique is relatively insensitive to minor variatioils in the histogram.

A second technique of detecting offset is to use a reference circuit board with measured height histogram. The height histogram of this reference board can be saved and correlated against the histogram of the board under test. A peak in the correlation function indicates that the height of the board under test has been adjusted to be equal to the height of the reference board.

Figure 2:
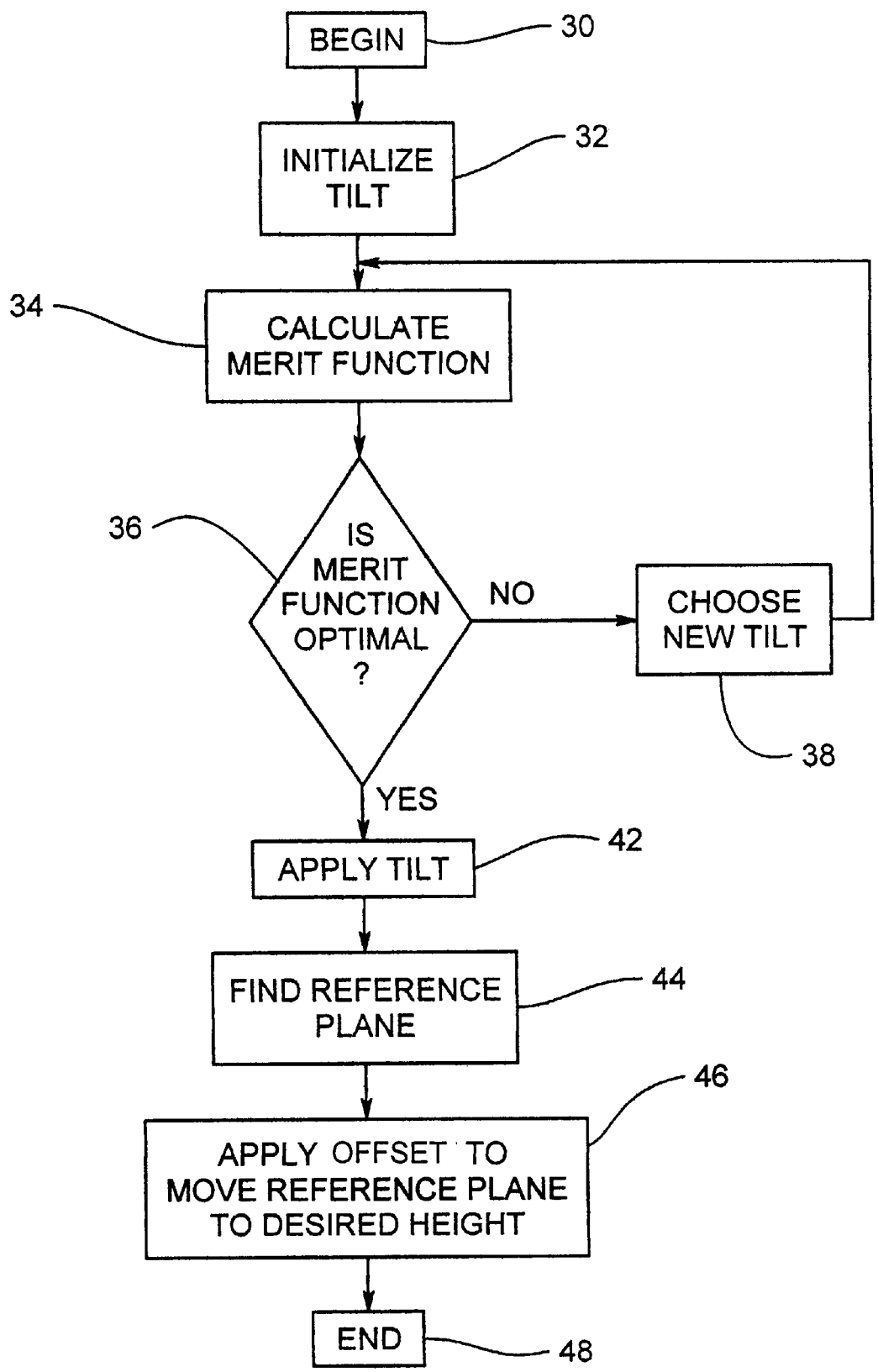
FIG. 2 is a flow diagram presenting the procedure for detilting a set of height measurements from the surface of an object.

With the foregoing analysis in mind, we now refer to FIG. 2 where a flow chart for the process of the invention is depicted. The process is started bib engaging a begin command under block 30. The begin command is followed with initialization steps for tilt under block 32 which is followed by the operative command to calculate the merit function under block 34. The merit function is optimized under decision block 36. As will be discussed hereinbelow, the optimization of the merit function is one of the key elements of the present invention. Under decision block 36 a subroutine block 38 operates to choose/select a new tilt until a positive response is obtained as to whether the calculated merit function is optimal. The subroutine is disengaged when the merit function is optimized under decision block 36. Hereafter, the tilt for which the merit function is optimal is applied to the measurement under block 42. Consequently, a new reference plane is generated at block 44. As discussed hereinabove, this reference plane is then deducted from the raw image of object 18 to yield an untilted substrate. The reference plane under block 44 is moved to a desired height under block 46 using an offset to move the reference plane to a desired height. This height offset is then removed to produce a height image where the heights of the features can be measured. The generation of the proper tilt and the solution of the reference plane applicable to the tilt which is then applied to the desired height is confirmed under block 48 and consequently the end of the optimal solution is reached.

One specific detilting approach is based on the realization that when the heights are referenced to the proper base plane, surfaces with significant approximately planar regions will have many heights that are very similar. Furthermore, for most surfaces, the range in heights will be smaller when referenced to proper base plane. Only surfaces with very unusual features will not have heights confined to a narrower range when referenced to a proper base plane. This would seem to be true generally, and certainly for all surfaces with a reasonable distribution of features. Therefore, any function related to the distribution of heights will have greater values.

The simplest way to take advantage of this property is first to construct a histogram of the measured heights, $n(h_i)$. A grid is constructed of heights $h_i$ where heights h are associated with the grid points by the relationship, $h_i - \delta/2 < h \leq h_i + \delta/2$, and $\delta$ is the grid spacing. A sum over $n(h_i)$ yields the total number of height measurements. In order to give more weight to larger groupings of heights in the distribution, $n(h_i)$ is squared. The squared quantities are summed to yield a merit function, as follows, $$m = \sum_{i=1}^{\mu} [n(h_i)]^2. \tag{1}$$

where p is the number of grid points.

The merit function m is related to the tilt of the plane from which the height measurements refer. Larger groupings of heights would be expected when the measurements are made relative to the proper base plane. Therefore, m should be made a maximum to find the desired reference plane. In other words, the closer the measurement plane is to a plane parallel to the nominal base plane, the larger the merit function. The sum of the squares of the histogram values, i.e., m, is related to the variance (standard deviation) of $n(h_i)$. This functional will serve as a practical merit function for the detilting of the contour measurements.

The merit function is sensitive to the discretization of the height levels. In the extreme, when $\delta$ is very small, each discrete height measurement could lie in its own histogram interval. In this extreme, m=N, where N is the number of height measurements. Then, m would be independent of the tilt. Obviously, such a merit function would be totally useless. If the discrete merit function of Eq. 1 is to have a relationship with the tilt, the discretization in heights should not be taken to an extreme unless the number of points of the height measurement becomes corresponding larger. In practice, the determination of the reference plane by maximizing the discrete merit function m should not be sensitive to the exact discretization in heights as long as the discretization is coarse enough that significant numbers of points in the histogram contain a fairly large number of pixels.

The histogram $n(h_i)$ is related to the probability distribution of heights assuming that the heights are uncorrelated random variables. Therefore, if the grid is made too fine, each height seems unique, and we obtain no information on the distribution. The easy solution is to use a grid that is not too fine. While the easy solution may be acceptable, it sacrifices accuracy for a given set of measurements.

Of course, the heights are correlated because the physical surface is continuous, so points physically near each other on the surface will have comparable heights. The set of measurements will contain information on this correlation based on the relationship of the measurements over the surface. A more general, and typically better, merit function would have the form $$m = \sum_{a=1}^{n} \sum_{b=1}^{n} f(h_a, h_b), \tag{2}$$

where $f(h_i, h_j)$ provides information on the correlation in heights and n is the measurement values. If the heights are placed in the bins of a histogram, Eq. (2) becomes:

$$m = \sum_{i=1}^{p} \sum_{j=1}^{p} n(h_i)n(h_j)f(h_i, h_j). \tag{3}$$

If $f(h_i - h_j)$ is selected to be the following step function, $$f(h_i, h_j) = 1, |z_i - z_j| \leq \delta/2, \tag{4}$$
$$= 0, |z_i - z_j| > \delta/2,$$

the original merit function in Eq. (1) is reproduced. The functional relationship in Eq. (4) is just the imposition of the bins used in creating Eq. (1) while otherwise uncoupling the heights.

Eq. (2) can be understood from a different perspective. The portion of monochromatic light reflected directly back to the light source can be determined as a function of wavelength of light and the height distribution. The reflected light is a maximum when the base plane is perpendicular to the incidence direction of propagation of the light. Therefore, the measurement of the portion of light reflected directly back toward the source is a reasonable choice as a merit function as follows:

$$m = \sum_{a=1}^{n} \sum_{b=1}^{n} \cos(k(h_a - h_b)), \tag{5}$$

where the wave number k is related to the wavelength of the light $\lambda$ by $k = 2\pi/\lambda$.

If the heights are again placed in bins, Eq. (5) becomes $$m = \sum_{i=1}^{p} \sum_{j=1}^{p} n(h_i)n(h_j)\cos(k(h_i - h_j)), \tag{6}$$

which is in the form of Eq. (3). Note that Eq. (6) is a calculational tool. From this perspective, the equation can be used even if the actual light in the measurements is not monochromatic and even if the measurements are not even optically obtained.

For a light source that is not monioclhromatic, Eq. (5) generalizes to $$m = \sum_{a=1}^{n} \sum_{b=1}^{n} f(h_a - h_b), \quad (7)$$

where $f(h_i-h_j)$ is the cosine transform of the spectral density $F(k)$, $$f(h_i-h_j) = \int_0^\infty \cos(k(h_i-h_j)) f(k) dk. \quad (8)$$

If the heights are again placed on a histogram, Eq. (7) becomes $$m = \sum_{i=1}^{p} \sum_{j=1}^{p} n(h_i) n(h_j) f(h_i - h_j), \quad (9)$$

which is in the form of Eq. (3).

If the surface is tilted so as to maximize the merit function, the optical analogy is that of a mirror that has been tilted to center its Fraunhofer diffraction pattern on a detector. The maximum possible value of the merit function is always $N^2$, the square of the number of pixels. This is analogous to the maximum intensity possible in a perfect, diffraction-limited system. The ratio of the actual central intensity to the maximum central intensity $S-m/N^2$ is called the Stiehl ratio, and is often used to characterize the quality of an optical system [Schroeder, 1987].

Again, Eq. (9) is a calculational to, so the spectral density does not have to reflect the spectral density of the light source. A convenient and simple form of $f(h_i-h_j)$ is the following step function, $$f(h_i - h_j) = 1, |i - j| \leq w, \quad (10)$$
$$= 0, |i - j| > w,$$

where w is an integer 1 or greater. Using Eq. (10), Eq. (9) simplifies to $$m = \sum_{i=1}^{p} \sum_{j=i-w}^{i+w} n(h_i) n(h_j). \quad (11)$$

The subexpression $$\sum_{j=i-w}^{i+w} n(h_j) \quad (12)$$

is a sliding sum which can be updated rapidly from previously evaluated sums through the relation, $$\sum_{j=i-w}^{i+w} n(h_j) = \sum_{j=(i-1)-w}^{(i-1+w)} n(h_j) + n(h_{i+w}) - n(h_{i-1-w}). \quad (13)$$

So as i is incremented in the summation of Eq. (11), the subexpression in Eq. (12) can be evaluated with one addition and one subtraction using Eq. (13). Therefore, the calculation of the merit function m from Eq. (11) scales just by p rather than p2.

Figure 3:
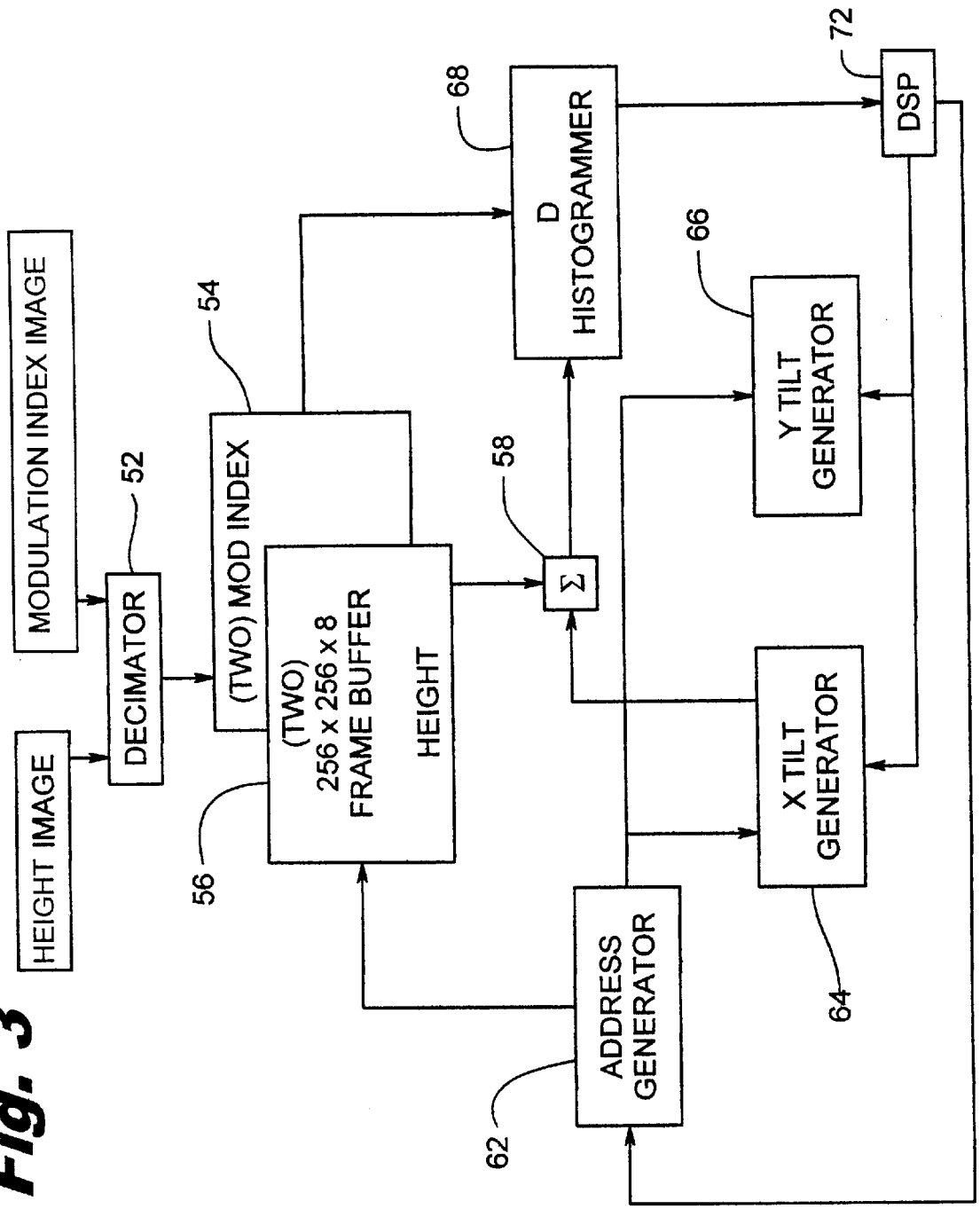
FIG. 3 is a block diagram of a histogram accelerator in accordance with the present invention.

Referring now to FIG. 3, a block diagram of the hardware for the histogram accelerator is shown. The histogram accelerator is a dedicated calculator for producing histograms of a height image to which has been applied prescribed x and y tilts. This computation represents the bulk of the work in detilting; thus it is the most logical candidate for hardware acceleration techniques.

Decimator 52 sub-samples the height image and the modulation index image, transferring them into frame buffers 56 and 54, respectively. Adder 58 receives height input from frame buffer 56. Address generator 62 provides the pixel address to frame buffer 56, which transfers the height of the selected pixel to adder 58. Further, address generator 62 sends the pixel address to x-axis tilt generator 64 and y-axis tilt generator 66, as shown in FIG. 3. These tilt generators calculate the height of a plane of the prescribed tilt and apply them also to adder 58. Adder 58 sends the resulting sum to digital histogrammer 68. Digital signal processor (DSP) 72 receives histogram input from digital histogrammer 68, and sends output to x-axis tilt generator 64, y-axis tilt generator 66 and address generator 62.

The cooperative operation of the histogram accelerator and the algorithm of the present invention is of particular significance. Referring now to FIGS. 2 and 3, after the software receives the begin command under block 30, the next step is to initialize tilt under block 32. The initialization command is directed to decimator 52. Decimator 52 decimates height and modulation index data from the images generated by the image processing system. There are at least two decimators to decimate at two different frequencies, in order to reduce the effects of aliasing caused by the decimation. Primarily, the histogram data is weighted by modulation index 54, which suppresses background noise from the data. The modulation index 54 data is then digitized by histogrammer 68. The frame buffer holds an array of at least 256×256 pixels, with a depth of at least 8 bits. The height of the reference plane is calculated in the manner discussed hereinabove for a known address, obtained from address generator 62. The height is then transferred to adder 58. Adder 58 sums the height data, the x-tilt and the y-tilt data. The output from adder 53 is input into histogrammer 68 where the register at the address corresponding to the calculated height is incremenited by an amount equal to tile modulation index at that location. The software utilizes the digitized data to calculate the merit function under block 34 and proceeds in the manner shown in FIG. 2.

As mentioned earlier, a two-dimensional iterative search is used to find the x- and y-tilt where the merit function is maximal. It is appropriate at this point to elaborate only these iterative techniques. Since the height image is roughly square, and the pixels are also square, it should not be surprising that the merit function varies similarly with respect to x- and y-tilts. Because of this, the contours of equal merit are roughly circular; an effective optimization procedure is to perform four successive one-dimensional optimizations along the x- and y-axes. It is possible that more sophisticated procedures would give better performance, but the present strategy has proved satisfactory in practice.

The one-dimensional optimizations are carried out by a well-known procedure known as the "Golden Mean" algorithm [Press, et al., 1992]. The interested reader will find it well described in the reference cited, but a brief summary of the method follows: Three abscissae are chosen which bracket the desired maximum. The larger interval is subdivided so that the ratio of intervals is the Golden Mean ($\phi=(1+\sqrt{5})/2$). The abscissa having the highest merit function, and its immediate neighbor on each side, are kept for the next iteration; the fourth value is discarded. This procedure converges linearly with a rate of 1/φ. More sophisticated procedures could be devised, but the Golden Mean algorithm is very robust; its performance is relatively insensitive to noise in the data, and it degrades gracefully under adverse conditions. These are important considerations for embedded software. (Press, William H., Saul A. Teukolsky, William T. Vetterling and Brian P. Flannery, *Numerical Recipes in C*, 2nd ed. (Cambridge University Press, 1992).)

Having thus described the preferred embodiment of this invention those skilled in the art will readily appreciate the way other embodiments, modifications and variations which can be made to the method and apparatus of the present invention without departing from the scope of the claims provided below.

We claim:

1. A method for estimating tilt of a substrate, the substrate represented in a raw height image, the method comprising:

applying a chosen tilt to a reference plane established relative to the substrate;

computing a histogram of the heights with respect to the reference plane;

calculating a merit function from the histogram;

repeating the computing and calculating steps at a plurality of chosen tilts until the merit function is optimized; and reporting as the estimated tilt, the tilt of the reference plane that optimizes the merit function.

2. The method of claim 1, wherein the merit function is greatest when the tilt of the raw height image coincides with the tilt of the reference plane.

3. The method of claim 1, further comprising subtracting the reference plane, at the tilt that optimizes the merit function, from the raw height image to produce an untilted representation of the substrate.

4. The method of claim 3, further comprising estimating the height of the untilted representation of the substrate to define an offset.

5. The method of claim 4, further comprising removing the offset to produce a height image.

6. The method of claim 1, wherein the chosen tilt is changed by a two-dimensional iterative search.

7. The method of claim 1, wherein the merit function is a function of the sum of the squares of values in the histogram.

8. The method of claim 1, wherein the substrate is nonplanar.

9. The method of claim 1, wherein the merit function is calculated according to the following equation:

$$m = \sum_{i=1}^{p} \sum_{j=1}^{p} n(h_i)n(h_j)f(h_i - h_j),$$

where: $h_i$, $h_j$ are heights associated with grid points by the relationship $h_i - \delta/2 < h \leq h_i + \delta/2$, and $\delta$ is the grid spacing;

$n(h_i)$, $n(h_j)$ are histograms of $h_i$, $h_j$;

$f(h_i - h_j)$ is the cosine transform of the spectral density;

p is the number of grid points; and i, j are integers.

10. A method for estimating a feature height with respect to a substrate, the substrate represented in a raw height image, the method comprising:

applying a chosen tilt to a reference plane established relative to the substrate;

computing a histogram of the heights with respect to the reference plane;

calculating a merit function from the histogram;

repeating the computing and calculating steps at a plurality of chosen tilts until the merit function is optimized, the optimized merit function corresponding to an optimized tilt of the reference plane and an optimized histogram, the optimized histogram having a peak therein;

subtracting the reference plane with the optimized tilt from the raw height image to produce an untilted-substrate image representing an untilted substrate;

locating the peak of the optimized histogram, which peak corresponds to the height of the untitled substrate; and subtracting the height of the untilted substrate from the untilted substrate image, to provide the feature height.

11. The method of claim 10, wherein the merit function is greatest when the tilt of the raw height image coincides with the tilt of the reference plane.

12. The method of claim 10, wherein the chosen tilt is changed by a two-dimensional iterative search.

13. The method of claim 10, wherein the merit function is a function of the sum of the squares of values in the histogram.

14. The method of claim 10, wherein the substrate is nonplanar.

15. The method of claim 10, wherein the merit function is calculated according to the following equation:

$$m = \sum_{i=1}^{p} \sum_{j=1}^{p} n(h_i)n(h_j)f(h_i - h_j),$$

where: $h_i$, $h_j$ are heights associated with grid points by the relationship $h_i - \delta/2 < h < h_i + \delta/2$, and $\delta$ is the grid spacing;

$n(h_i)$, $n(h_j)$ are histograms of $h_i$, $h_j$;

$f(h_i - h_j)$ is the cosine transform of the spectral density;

p is the number of grid points; and i, j are integers.

16. An apparatus for estimating tilt of a substrate, the apparatus comprising:

a detector for detecting light reflected from a substrate; and a computer system operably connected to the detector, the computer system comprising computer-implemented software performing the following functions:

representing the substrate as a raw height image;

applying a chosen tilt to either the raw height image or a reference plane established relative to the substrate;

computing a histogram of the heights with respect to the reference plane;

calculating a merit function from the histogram;

repeating the computing and calculating steps at a plurality of chosen tilts until the merit function is optimized; and reporting, as the estimated tilt, the tilt of the reference plane that optimizes the merit function.

17. The apparatus of claim 16, wherein the merit function is calculated according to the following equation:

$$m = \sum_{i=1}^{p} \sum_{j=1}^{p} n(h_i)n(h_j)f(h_i - h_j),$$

where: $h_i$, $h_j$ are heights associated with grid points by the relationship
$h_i - \delta/2 < h \leq h_i + \delta/2$, and $\delta$ is the grid spacing;
$n(h_i)$, $n(h_j)$ are histograms of $h_i$, $h_j$;
$f(h_i - h_j)$ is the cosine transform of the spectral density;
p is the number of grid points; and
i, j are integers.

18. An apparatus for estimating tilt of a substrate, the apparatus comprising:
 a detector for detecting light reflected from a substrate; and
 a computer system operably connected to the detector, the computer system comprising computer-implemented software performing the following functions:
 representing the substrate as a raw height image;
 applying a chosen tilt to either the raw height image or a reference plane established relative to the substrate;
 computing a histogram of the heights with respect to the reference plane;
 calculating a merit function from the histogram;
 repeating the computing and calculating steps at a plurality of chosen tilts until the merit function is optimized, the optimized merit function corresponding to an optimized tilt of the reference plane and an optimized histogram, the optimized histogram having a peak therein;
 subtracting the reference plane, at the tilt that optimizes the merit function, from the raw height image to produce an untilted-substrate image representing an untilted substrate;
 locating the peak of the optimized histogram, which peak corresponds to the height of the untilted substrate; and
 subtracting the height of tie untilted substrate from the untilted substrate image, to provide the feature height.

19. The apparatus of claim 18, wherein the merit function is calculated according to the following equation:

$$m = \sum_{i=1}^{p} \sum_{j=1}^{p} n(h_i)n(h_j)f(h_i - h_j),$$

where: $h_i$, $h_j$ are heights associated with grid points by the relationship
$h_i - \delta/2 < h \leq h_i + \delta/2$, and $\delta$ is the grid spacing;
$n(h_i)$, $n(h_j)$ are histograms of $h_i$, $h_j$;
$f(h_i - h_j)$ is the cosine transform of the spectral density;
p is the number of grid points; and
i, j are integers.

20. A method for estimating tilt of a substrate, the substrate represented in a raw height image, the method comprising:
 applying a chosen tilt to the raw height image,
 computing a histogram of the heights with respect to a reference plane established relative to the substrate;
 calculating a merit function from the histogram;
 repeating the computing and calculating steps at a plurality of chosen tilts until the merit function is optimized; and
 reporting, as the estimated tilt, the chosen tilt that optimizes the merit function.

21. A method for estimating a feature height with respect to a substrate, the substrate represented in a raw height image, the method comprising:
 applying a chosen tilt to the raw height image;
 computing a histogram of the heights with respect to a reference plane established relative to the substrate;
 calculating a merit function from the histogram;
 repeating the computing and calculating steps at a plurality of chosen tilts until the merit function is optimized, the optimized merit function corresponding to an optimized tilt and an optimized histogram, the optimized histogram having a peak therein;
 subtracting the reference plane with the optimized tilt from the raw height image to produce an untilted-substrate image representing an untilted substrate;
 locating the peak of the optimized histogram, which peak corresponds to the height of the untilted substrate; and
 subtracting the height of the untilted substrate from the untilted substrate image, to provide the feature height.

22. A method for estimating tilt of a substrate, the substrate represented in a raw height image, the method comprising:
 applying a chosen tilt to a reference plane established relative to the substrate;
 computing a histogram, using the heights with respect to the reference plane;
 calculating a merit function from the histogram;
 repeating the computing and calculating steps at a plurality of chosen tilts until the merit function is optimized; and
 reporting, as the estimated tilt, the tilt of the reference plane that optimizes the merit function.

23. The method of claim 22, wherein the histogram is a histogram of heights with respect to the reference plane.

24. The method of claim 22, further comprising subtracting the reference plane, at the tilt that optimizes the merit function, from the raw height image to produce an untilted representation of the substrate.

25. The method of claim 24, further comprising estimating the height of the untilted representation of the substrate to define an offset, and removing the offset to produce a height image.

26. An apparatus for estimating tilt of a substrate, the apparatus comprising:
 a detector for detecting light reflected from a substrate; and
 a computer system operably connected to the detector, the computer system comprising computer-implemented software parforming the following functions:
 representing the substrate as a raw height image;
 applying a chosen tilt to either the raw height image or a reference plane established relative to the substrate;
 computing a histogram, using the heights with respect to the reference plane;
 calculating a merit function from the histogram;
 repeating the computing and calculating steps at a plurality of chosen tilts until the merit function is optimized; and
 reporting, as the estimated tilt, the tilt of the reference plane that optimizes the merit function.

27. The apparatus of claim 26, wherein the histogram is a histogram of heights with respect to the reference plane.

28. The apparatus of claim 26, wherein the computer-implemented software subtracts the reference plane, at the tilt that optimizes the merit function, from the raw height image to produce an untilted representation of the substrate.

29. The apparatus of claim 28, further comprising estimating the height of the untilted representation of the substrate to define an offset, and removing the offset to produce a height image.

30. A method for measuring the image of a two-dimensional map having a topography of a substrate wherein a computer inplemented software is used with a device to generate a reference plane coincident with a spatial tilt of said substrate comprising the device-implemented steps of:

obtaining a raw image of the two-dimensional map;

developing a histogram of heights in said raw image;

calculating a merit function from said histogram of heights;

optimizing said merit function to calculate a tilted reference plane;

subtracting said tilted reference plane from said raw image to thereby yield an untilted substrate;

estimating the height of the untilted substrate to define an offset; and removing said offset from the untilted substrate to produce a height image.

31. The method according to claim 30 wherein a frame buffer with a capacity of 256 pixels and 256 intervals with a depth of 8 bits is used to store information relating to histogram height.

32. The method according to claim 31 wherein said histogram height is further directed to a calculator.

33. The method according to claim 32 wherein said histogram height is further integrated with x-tilt and y-tilt information by said calculator and directed to a histogrammer to be digitized.

* * * * *